United States Patent
Iio et al.

(10) Patent No.: US 11,769,322 B2
(45) Date of Patent: Sep. 26, 2023

(54) PROGRAM CREATION DEVICE, OBJECT DETECTION SYSTEM, ANCHOR SETTING METHOD, AND ANCHOR SETTING PROGRAM

(71) Applicant: MITSUBISHI HEAVY INDUSTRIES, LTD., Tokyo (JP)

(72) Inventors: Satoshi Iio, Tokyo (JP); Kiichi Sugimoto, Tokyo (JP); Kenta Nakao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 321 days.

(21) Appl. No.: 17/170,244

(22) Filed: Feb. 8, 2021

(65) Prior Publication Data

US 2021/0303823 A1    Sep. 30, 2021

(30) Foreign Application Priority Data

Mar. 31, 2020   (JP) .................................. 2020-063281

(51) Int. Cl.
| | |
|---|---|
| *G06N 20/00* | (2019.01) |
| *G06V 10/82* | (2022.01) |
| *G06V 20/64* | (2022.01) |
| *G06V 10/74* | (2022.01) |
| *G06V 10/764* | (2022.01) |
| *G06V 10/774* | (2022.01) |

(52) U.S. Cl.
CPC ............ *G06V 10/82* (2022.01); *G06N 20/00* (2019.01); *G06V 10/761* (2022.01); *G06V 10/764* (2022.01); *G06V 10/774* (2022.01); *G06V 20/64* (2022.01)

(58) Field of Classification Search
None
See application file for complete search history.

(56) References Cited

U.S. PATENT DOCUMENTS

2018/0039853 A1   2/2018 Liu et al.
2019/0108411 A1*  4/2019 Liu ...................... G06V 10/454

FOREIGN PATENT DOCUMENTS

| JP | 5172749 | 3/2013 |
|---|---|---|
| JP | 2018-22484 | 2/2018 |

* cited by examiner

*Primary Examiner* — Dov Popovici
(74) *Attorney, Agent, or Firm* — Wenderoth, Lind & Ponack, L.L.P.

(57) ABSTRACT

A program creation device includes training data including image data, a setting unit configured to set information of a frame specifying a region for each cell for detecting the presence or absence of the object from the image, and a learning unit configured to execute machine learning of the training data and to create a learned program for extracting the object from the image. The setting unit acquires information on a target region of the training data and on aspect ratios of the anchor, calculates a degree of matching between the anchor and the target region for each aspect ratio while changing a size of the anchor, and calculates an adoption rate of the target region whose degree of matching is a proportion no less than a threshold, and determines, based on a result of the calculation, the size of the anchor used in the learned program.

9 Claims, 18 Drawing Sheets

PROGRAM CREATION DEVICE, OBJECT DETECTION SYSTEM, ANCHOR SETTING METHOD, AND ANCHOR SETTING PROGRAM

CROSS-REFERENCE TO RELATED APPLICATIONS

This application claims the benefit of priority to Japanese Patent Application Number 2020-063281 filed on Mar. 31, 2020. The entire contents of the above-identified application are hereby incorporated by reference.

TECHNICAL FIELD

The present disclosure relates to a program creation device, an object detection system, an anchor setting method, and an anchor setting program.

RELATED ART

As a system for detecting an object from an acquired image, there is a system for detecting an object by using a learned program in which deep learning (machine learning) is performed on a large number of images. In object detection using general deep learning, first, convolution processing using a specific filter coefficient is performed on an image, which is used as an input, to extract features. Next, rectangular regions (bounding boxes) called anchors are arranged in feature spaces having different resolutions obtained in the process of the convolution processing, and a score indicating the likelihood of an object is calculated from features in the region for each anchor. Using the calculated score, the size of the anchor whose score is equal to or greater than the threshold value is adjusted by regression processing, and the anchor is output as a detection result.

SUMMARY

In deep learning, a plurality of types of anchor shapes are set, and detection of an object is performed using anchors having different shapes, thereby improving the accuracy of detection of an object. However, as the number of anchors increases, the amount of computation processing increases. Therefore, the number of usable anchors is limited according to the processing capacity and the length of time until the computation result is obtained. As described above, it is desired to improve the accuracy of detection of an object while suppressing an increase in the number of anchors to be set.

At least one embodiment of the present disclosure, in order to solve the above problem, provides a program creation device, an object detection system, an anchor setting method, and an anchor setting program, which are capable of appropriately setting a shape of an anchor and detecting an object with high accuracy.

The present disclosure provides a program creation device configured to create an object detection program for detecting whether an object is included in an image. The program creation device includes, training data including a plurality of image data including area information of the object, a setting unit configured to set an anchor that is information of a frame specifying a region for each cell for detecting the presence or absence of the object from the image, and a learning unit configured to execute machine learning of the training data based on the information of the setting unit and to create a learned program for extracting the object from the image. The setting unit acquires information on a target region of the training data and on aspect ratios of the anchor, calculates a degree of matching between the anchor and the target region for each aspect ratio while changing a size of the anchor, and calculates an adoption rate of the target region whose degree of matching is a proportion no less than a threshold, and determines, based on a result of the calculation, the size of the anchor used in the learned program.

Additionally, the present disclosure provides an object detection system which includes, the program creation device described above, and an object detection device including, a computation unit configured to execute a learned program created by the program creation device, a camera unit configured to acquire an image, and a notification unit configured to notify an operator. The computation unit analyzes, by the learned program, an image acquired by the camera unit, and the notification unit notifies when it is detected that the object is included in the image.

Further, the present disclosure provides an anchor setting method of setting an anchor used in an object detection program for detecting whether an object is included in an image. The anchor setting method includes the steps of, acquiring training data including a plurality of image data including area information of the object, acquiring anchor information that is information of a frame specifying a region for each cell for detecting the presence or absence of the object from the image, acquiring information on a target region of the training data and on aspect ratios of the anchor, calculating a degree of matching between the anchor and the target region for each aspect ratio while changing the size of the anchor, and calculating an adoption rate of the target region whose degree of matching is a proportion no less than a threshold, and determining, based on a result of the calculation, the size of the anchor used in the learned program.

In addition, the present disclosure provides an anchor setting program for causing a processing of setting an anchor to be executed, where the anchor is used in an object detection program for detecting whether an object is included in an image. The anchor setting program causes the steps of; acquiring training data including a plurality of image data including area information of the object, acquiring anchor information that is information of a frame specifying a region for each cell for detecting the presence or absence of the object from the image, acquiring information on a target region of the training data and on aspect ratios of the anchor, calculating a degree of matching between the anchor and the target region for each aspect ratio while changing the size of the anchor, and calculating an adoption rate of the target region whose degree of matching is a proportion no less than a threshold, and determining, based on a result of the calculation, the size of the anchor used in the learned program, to be executed.

With the above-described configuration, it is possible to appropriately set the shape of the anchor and to detect the object with high accuracy.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments according to the present disclosure will be described in detail with reference to the drawings. Note that the invention is not limited to the embodiments. In addition, components in the following embodiments include components that can be easily replaced by those skilled in the art or substantially the same components. Furthermore, the components described below can be appropriately combined, and when there are a plurality of embodiments, each embodiment can be combined.

Object Detection System

Figure 1:
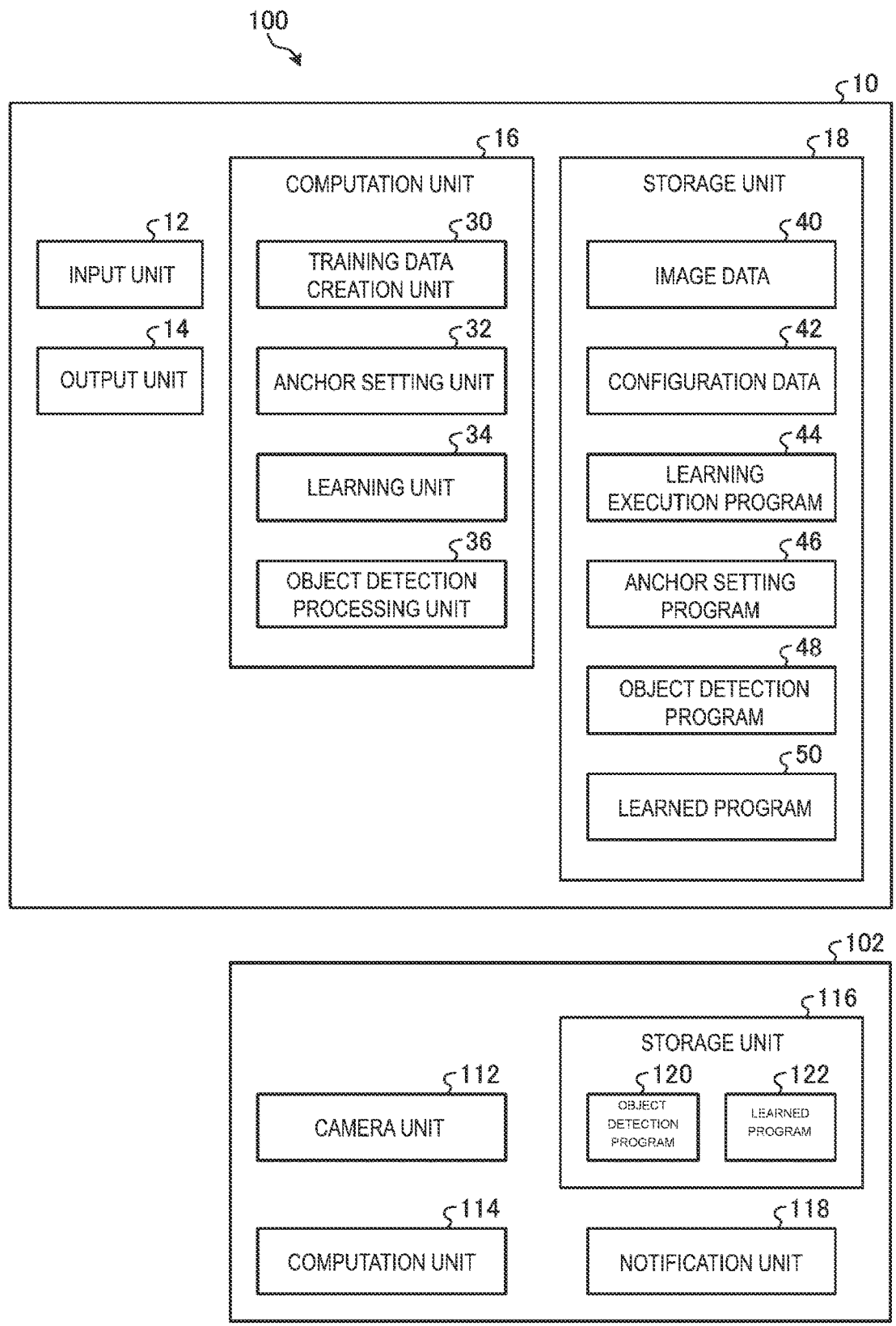
FIG. 1 is a block diagram illustrating an example of an object detection system.

FIG. 1 is a block diagram illustrating an example of an object detection system. The object detection system 100 according to the present embodiment includes a program creation device 10 and an object detection device 102. In an object detection system 100, a program creation device 10 creates a learned program capable of executing image determination processing for detecting an object from an image by using machine learning, for example, deep learning, and an object detection device 102 executes the learned program to detect the object. The object detection device 102 is installed in, for example, a moving object such as a vehicle or a flying object, or a building.

The program creation device 10 includes an input unit 12, an output unit 14, a computation unit 16, and a storage unit 18. The input unit 12 includes an input device such as a keyboard and a mouse, a touch panel, or a microphone that collects speech from an operator, and outputs a signal corresponding to an operation performed by the operator on the input device to the computation unit 16. The output unit 14 includes a display device such as a display, and displays a screen including various kinds of information such as a processing result and an image to be processed, based on a display signal output from the computation unit 16. The output unit 14 may include a recording device that outputs data on a recording medium. The program creation device 10 may include a communication unit that transmits data using a communication interface as the input unit 12 and the output unit 14. The communication unit transmits various data and programs acquired by communicating with an external device to the storage unit 18 and stores the data and programs. The communication unit may be connected to an external device via a wired communication line or a wireless communication line.

The computation unit 16 includes an integrated circuit (processor) such as a central processing unit (CPU) or a graphics processing unit (GPU), and a memory serving as a work area, and executes various processes by executing various programs using these hardware resources. Specifically, the computation unit 16 reads a program stored in the storage unit 18, deploys the program into the memory, and causes the processor to execute instructions included in the program deployed into the memory thereby executing various processing. The computation unit 16 includes a training data creation unit (an example of a data creation unit) 30, an anchor setting unit (an example of a setting unit) 32, a learning unit 34, and an object detection processing unit (an example of a processing unit) 36. Before describing each unit of the computation unit 16, the storage unit 18 will be described.

The storage unit 18 includes a non-volatile storage device such as a magnetic storage device or a semiconductor storage device, and stores various programs and data. The storage unit 18 includes image data 40, configuration data 42, a learning execution program 44, an anchor setting program 46, an object detection program 48, and a learned program 50.

The data stored in the storage unit 18 includes the image data 40 and the configuration data 42. The image data 40 includes training data used for learning. The training data is data which associates data of an image and a region (bounding box) where an object is displayed, when the object is included in the image. The image of the training data may include data used for learning and data for evaluating the accuracy of the program after learning. In addition, the image data may include image data in which an object needs to be detected. The configuration data 42 includes anchor setting information described later, information on conditions for executing the learned program, or the like.

The programs stored in the storage unit 18 include a learning execution program 44, an anchor setting program 46, an object detection program 48, and a learned program 50.

The learning execution program 44 performs deep learning processing on the training data included in the image data 40 based on the setting of the configuration data 42, and creates a learned program 50. As a deep learning model, it is possible to use a deep learning model such as Regions with Convolutional Neural Networks (R-CNN), You Only Look Once (YOLO), or Single Shot multibox Detector (SSD), in which a bounding box called an anchor is set for an image and a feature in the anchor based on the setting is processed to detect whether an object is included in the image.

The anchor setting program 46 executes, with the learning execution program 44 and the learned program 50, processing of setting an anchor to be used in performing image processing using the deep learning model. The anchor setting program 46 executes processing for setting the size of the anchor. Further, the anchor setting program 46 preferably executes processing for setting the aspect ratio of the anchor and the number of anchors to be used. The information set by the anchor setting program 46 is stored in the configuration data 42.

The object detection program 48 is a program that executes an object detection processing using the learned program 50. The object detection program 48 is also set with acquiring processing for an image and output processing of a determination result. The object detection program 48 may set processing for processing image data. The learned program 50 is a program created by executing the learning execution program 44. The object detection program 48 can calculate the feature (score) of the learned determination criterion by executing the learned program 50 by a computation unit that performs image processing, and can execute processing of detecting an object based on the feature.

In the storage unit 18, the learning execution program 44, the anchor setting program 46, and the object detection program 48 may be installed by reading the learning execution program 44, the anchor setting program 46, and the object detection program 48, which are recorded in the recording medium, or alternatively, the learning execution program 44, the anchor setting program 46, and the object detection program 48 may be installed by reading the learning execution program 44, the anchor setting program 46, and the object detection program 48, which are provided on the network.

The function of each unit of the computation unit 16 will be described. Each unit of the computation unit 16 can be executed by executing a program stored in the storage unit 18. When there is an object in the image data, the training data creation unit 30 associates the image data with frame information (bounding box) indicating a region of the object. The frame to be set is rectangular. The training data creation unit 30 sets frame information from an operation input to the input unit 12 in a state where, for example, an image is displayed on the output unit 14. The operation input to the input unit 12 is an operation in which the operator inputs information of a position surrounding the position of the frame (object) while viewing the image. Further, the training data creation unit 30 may acquire the result of the image extraction processing executed by the object detection processing unit 36. In this case, an operation performed by the operator to determine whether the position of the extracted frame is correct data of the training data may be detected, and data in which the position of the frame is determined to be correct by the operator may be acquired as the training data.

The anchor setting unit 32 executes the processing of the anchor setting program 46 and sets information of an anchor used in the image processing of the deep learning model executed by the learning unit 34 and the object detection processing unit 36. The processing of the anchor setting unit 32 will be described later.

The learning unit 34 executes the processing of the learning execution program 44 using the anchor setting set by the anchor setting unit 32, performs deep learning as training data of the image data 40, and creates a learned program. The processing of the learning unit 34 will be described later.

The object detection processing unit 36 processes the learned program 50 by using the object detection program 48, and executes processing of determining whether an object is included in the acquired image, that is, an object detection processing. The processing of the object detection processing unit 36 will be described later.

In the present embodiment, although the program creation device 10 includes the training data creation unit 30 and the object detection processing unit 36. However, the program creation device 10 may not include the training data creation unit 30 and the object detection processing unit 36. That is, the training data may be created by another device. The object detection processing unit 36 that executes the processing of detecting an object from an image may be provided only in the object detection device 102.

The object detection device 102 is installed in a moving body or a building as described above. The object detection device 102 may be capable of communicating with the program creation device 10, but may not have a communication function. Various processing conditions are set in advance in the object detection device 102 that does not have a communication function, and the object detection processing is executed based on the set conditions. The object detection device 102 may output the detection result to a control device that controls an installed mechanism. Thus, for example, in the case of a moving body, when an object is detected, a processing of stopping the moving body, a processing of avoiding the object, or the like can be performed.

The object detection device 102 includes a camera unit 112, a computation unit 114, a storage unit 116, and a notification unit 118. The camera unit 112 acquires an image of the target field of view. The camera unit 112 may continuously acquire images at a predetermined frame rate or may acquire images triggered by a predetermined operation.

The computation unit 114 includes an integrated circuit (processor) such as a CPU or a GPU and a memory serving as a work area, and executes various processing by executing various programs using these hardware resources. Specifically, the computation unit 114 reads a program stored in the storage unit 116, deploys the program into the memory, and causes the processor to execute instructions included in the program deployed into the memory, thereby executing various processing. The computation unit 114 executes a program stored in the storage unit 116 to execute processing of detecting an object from an image.

The storage unit 116 includes a non-volatile storage device such as a magnetic storage device or a semiconductor storage device, and stores various programs and data. The storage unit 116 stores an object detection program 120 and a learned program 122.

The notification unit 118 notifies the operator. The notification unit 118 includes a speaker, a light emitting device, a display, or the like. When the computation unit 114 executes processing and detects an object included in an image, the notification unit 118 notifies the operator that there is an object. When the object is a person, the person who is the detection target may be notified.

Figure 2:
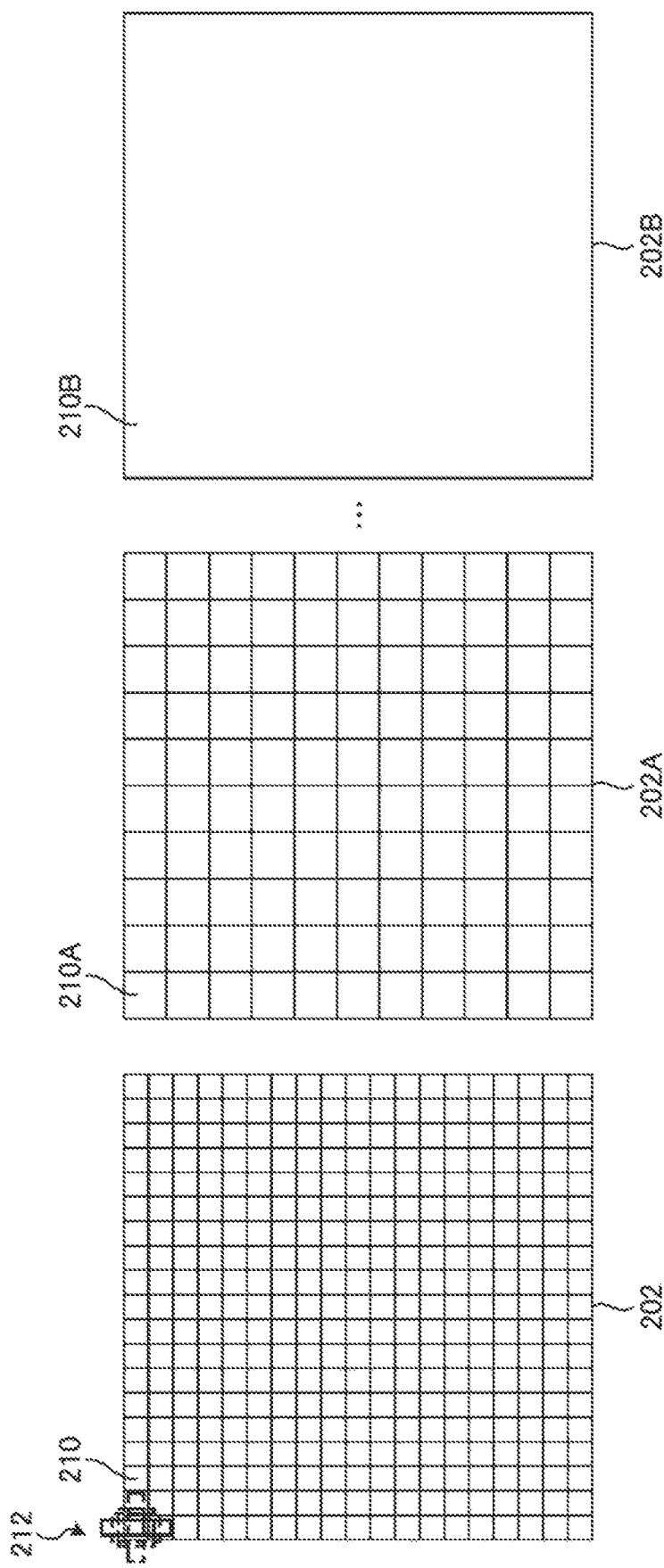
FIG. 2 is an explanatory diagram for describing an example of image processing of the object detection system.
Figure 3:
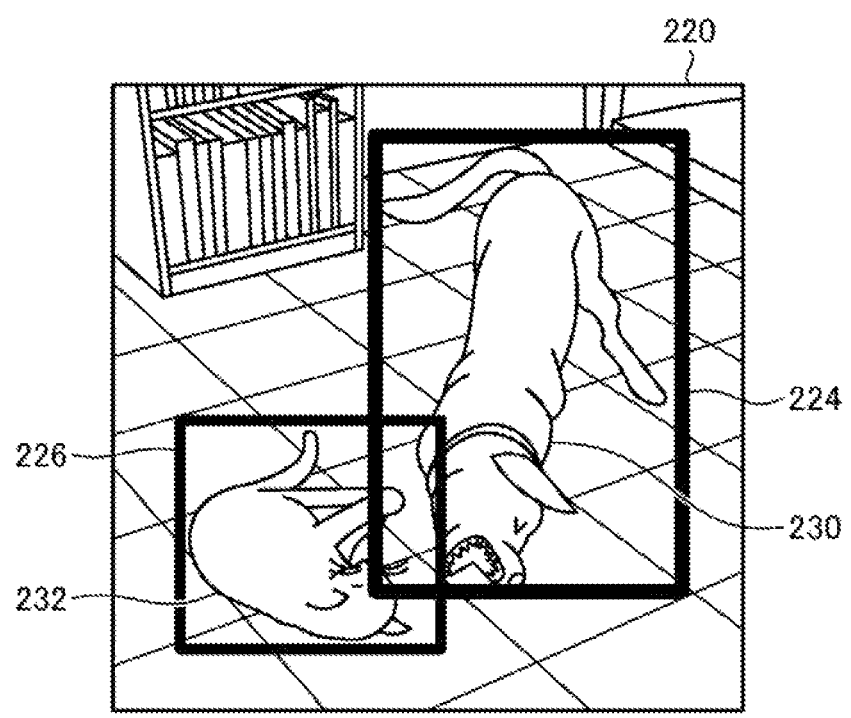
FIG. 3 is an explanatory diagram for describing an example of image processing.
Figure 4:
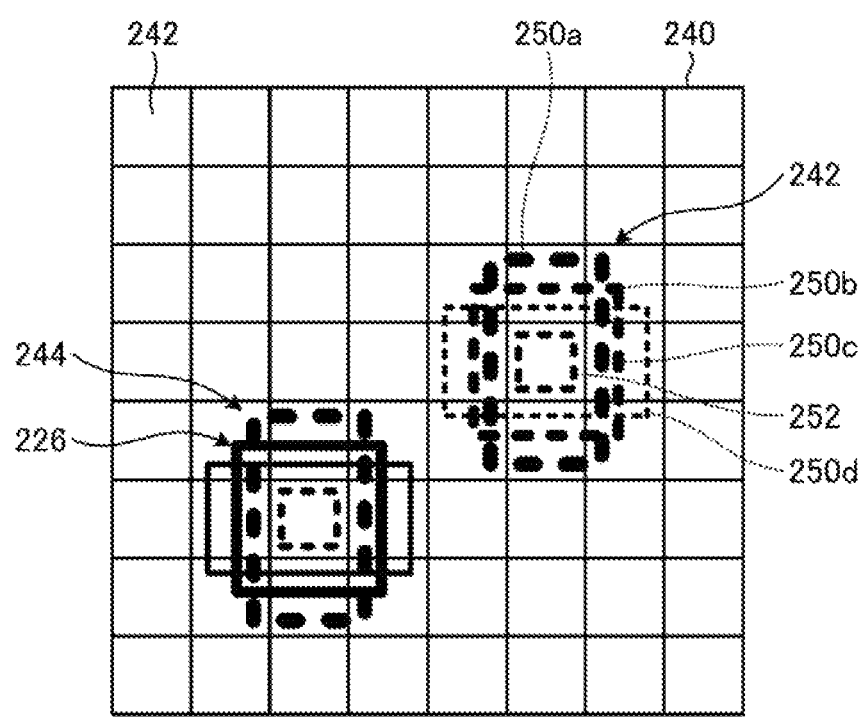
FIG. 4 is an explanatory diagram for describing an example of image processing.
Figure 5:
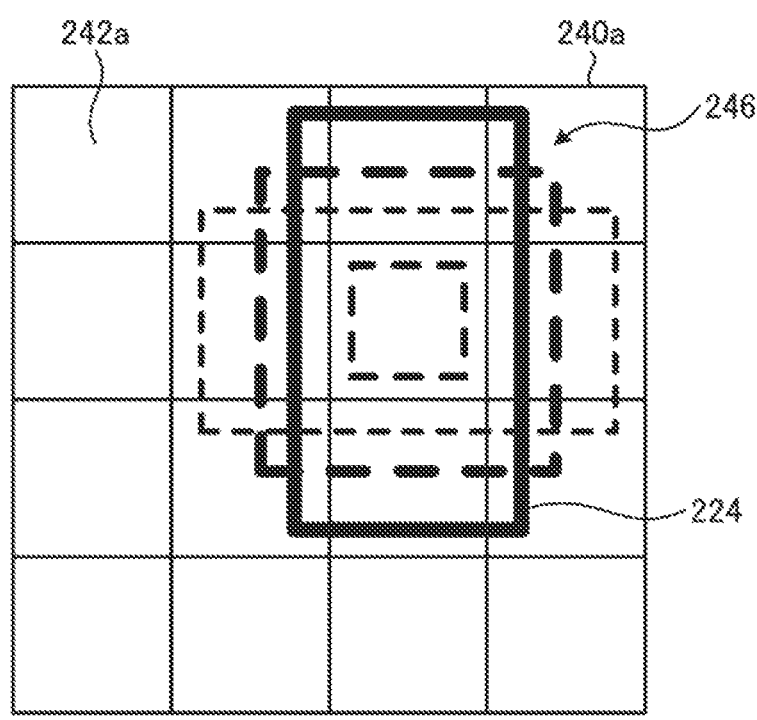
FIG. 5 is an explanatory diagram for describing an example of image processing.

FIG. 2 is an explanatory diagram for describing an example of image processing of the object detection system. FIGS. 3 to 5 are explanatory diagrams for describing an example of image processing.

The object detection processing unit 36 of the present embodiment determines whether an object is included in an image by performing image processing by the set deep learning. The learning unit 34 performs machine learning, for example, deep learning, using the training data generated by the training data creation unit 30 to generate a learned program to be executed by the object detection processing unit 36.

Here, in the deep learning of the present embodiment, convolution processing is performed on a target image, and a feature obtained from a plurality of pixels is set as one piece of cell information. Then, as illustrated in FIG. 2, the process of setting the features obtained from a plurality of cells as one piece of cell information is repeated. In this way, a plurality of feature maps having different cell sizes can be obtained for an image. In the deep learning, processing using an anchor assigned to each cell at the time of acquisition of a feature map is executed to detect an object.

That is, as illustrated in FIG. 2, a feature map (divided map) 202 is processed for one image to create a feature map 202A having a smaller number of divisions than the image data 202. In the feature map 202A, one cell 210A occupies a larger proportion of the entire image than the cell 210. The same processing is performed on the feature map 202A for a plurality of times to generate a feature map 202B in which only one cell (region) 210B is set. Here, for the processing when shifting to a different number of divisions, various parameters are set in computation processing executed in deep learning.

Here, in the setting of the deep learning, in order to calculate the evaluation of one cell, the anchor 212 is set as the information of the frame for acquiring the information. The anchor 212 of the present embodiment is set such that the center thereof coincides with the center of the cell to be evaluated. The size of the anchor 212 with respect to the cell is set, and the larger the cell, the larger the anchor 212. In addition, a plurality of anchors 212 for performing processing in deep learning are set.

Next, the training data will be described. FIG. 3 is an image 220 including a dog 230 and a cat 232. In the detection of an object, when the object is a dog, a frame 224 is set in a region where the dog 230 is displayed. A frame 224 is region information and is information indicating that the object is displayed, that is, a bounding box. The frame 224 is position information on the image 220. When the object is a cat, a frame 226 is set in a region where the cat 232 is displayed. When the object is an animal, both the frame 224 and the frame 226 may be set for one image 220. As illustrated in FIG. 3, information in which information of frames 224 and 226 surrounding the object is associated with an image 220 is image data of correct data and training data.

The object detection system 100 creates a learned model capable of extracting an object by performing a learning processing of a plurality of images, which includes image 220 containing information on frames 224 and 226 of the image data, while adapting the anchors, which are set for the teacher data, to each cell.

FIGS. 4 and 5 schematically illustrate a state in which the image of FIG. 3 is analyzed. In a feature map (divided map) 240 illustrated in FIG. 4, an image is divided into 8 rows and 8 columns. The feature map 240a illustrated in FIG. 5 is divided into four rows and four columns. In the feature map 240, as illustrated in the anchor unit 242 corresponding to the cell 252, a plurality of anchors 250a, 250b, 250c, and 250d having different aspect ratios are applied to each cell, and features of images included in regions of the anchors are compared for each anchor. The same applies to the feature map 240a.

In the case of the image 220 illustrated in FIG. 3, in the frame 226 of the cat 232, an anchor that matches the anchor unit 244 obtained by dividing the region of the image by the size of the cell 242 is detected in the feature map 240 illustrated in FIG. 4. The anchor corresponding to the frame 224 of the dog 230 is not detected as an anchor in the feature map 240 because the size of anchor is different. The anchor corresponding to the frame 224 of the dog 230 is detected as an anchor included in the anchor unit 246 set in the feature map 240a having a small number of divisions.

In this manner, the object detection system 100 applies the anchor to each cell of the feature map and processes the image in the anchor by deep learning to detect whether the object is included in the image data.

Here, when a state of degree of matching, that is, the ratio of overlap between the region where the object is displayed, which is the bounding box in case of training data, and the anchor is high can be maintained, the accuracy of learning also increases, and the object can be detected with high accuracy. Here, the degree of matching is evaluated by Intersection over Union (IoU). Specifically, it is a percentage of (matching portion between the bounding box and the anchor)/(union of the bounding box and the anchor). On the other hand, when the region where the object is displayed, which is the bounding box in case of the training data, is located at the boundary of the anchor, the degree of matching is low in any anchor at the time of deep learning, the amount of learning in deep learning does not increase, and the object may not be detected by the learned program. In addition, even at the time of actual detection, an anchor having a high degree of matching with the region including the object is not generated, and detection may not be performed. On the other hand, the object detection system 100 executes the following processing.

Anchor Setting Method

Figure 6:
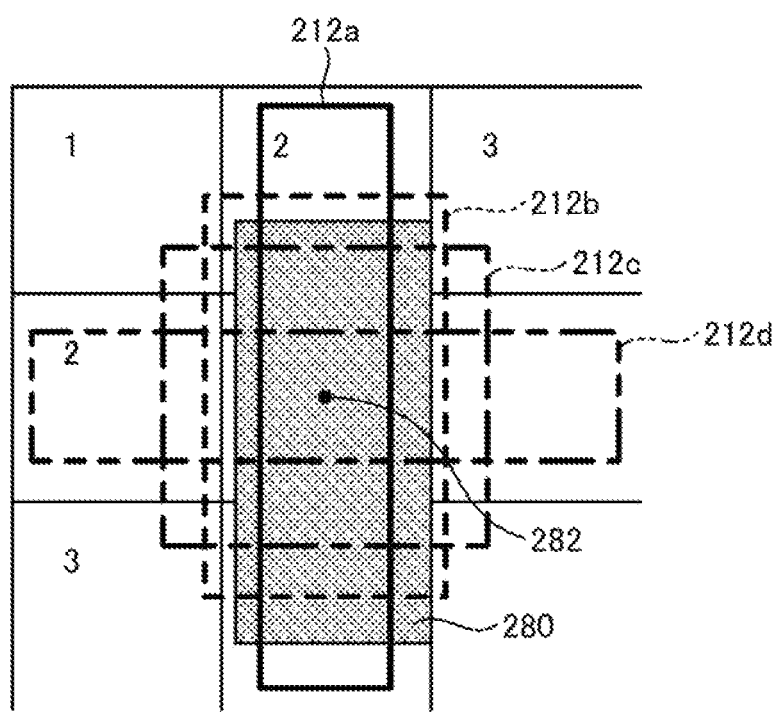
FIG. 6 is an explanatory diagram for describing an anchor.
Figure 7:
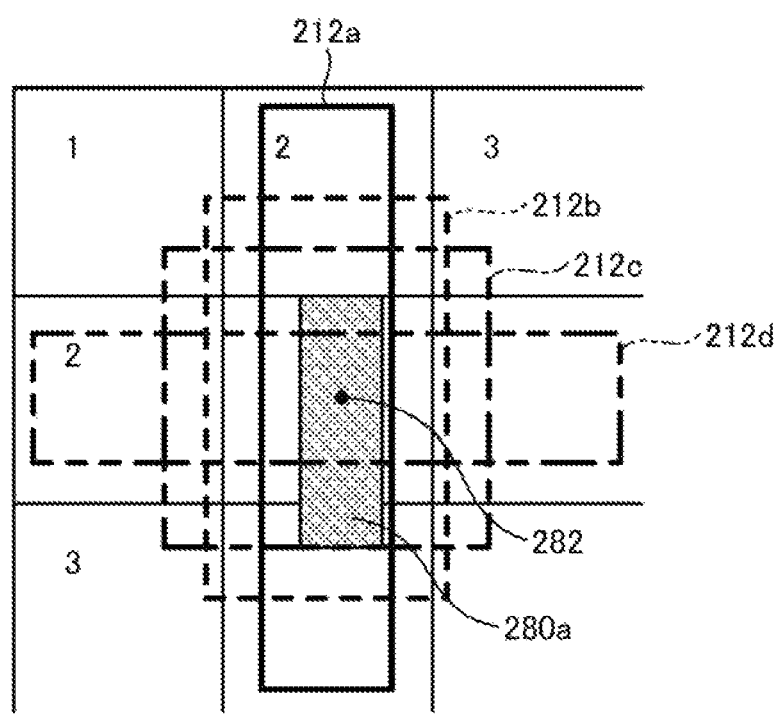
FIG. 7 is an explanatory diagram for describing an anchor.
Figure 8:
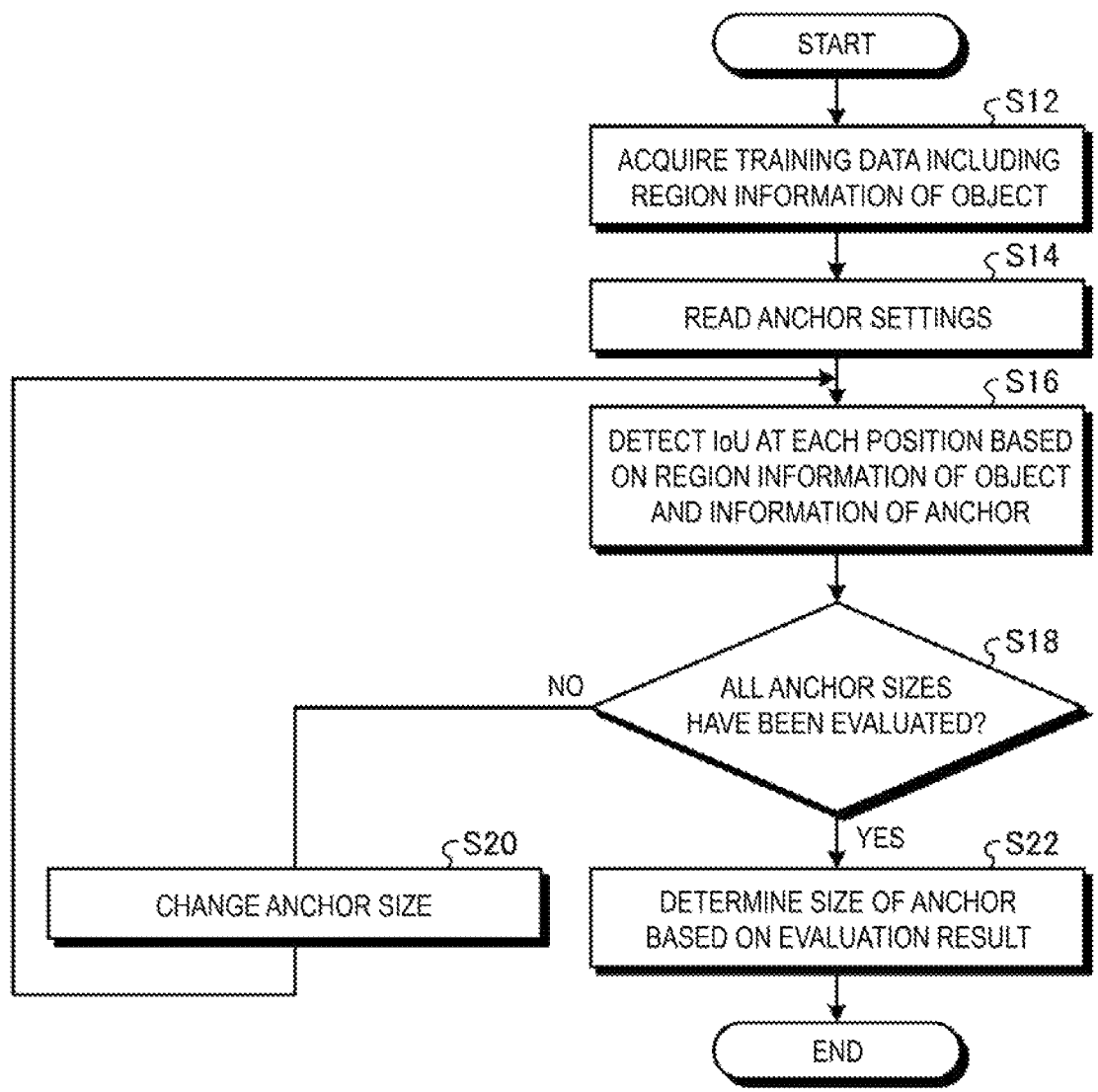
FIG. 8 is a flowchart illustrating an example of processing performed by an anchor setting unit.
Figure 9:
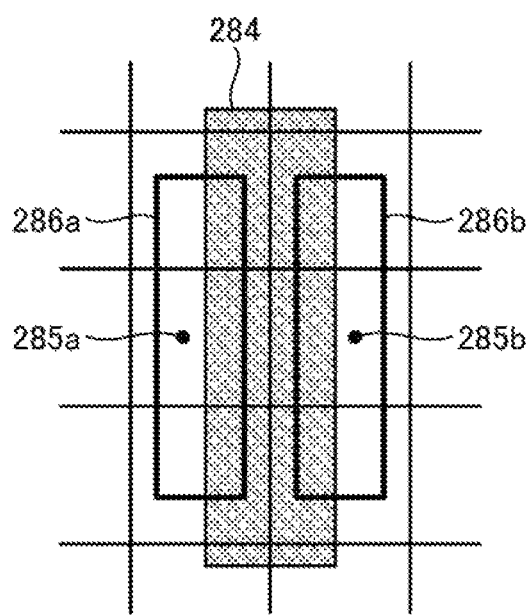
FIG. 9 is an explanatory diagram for describing an example of processing of an anchor setting unit.
Figure 10:
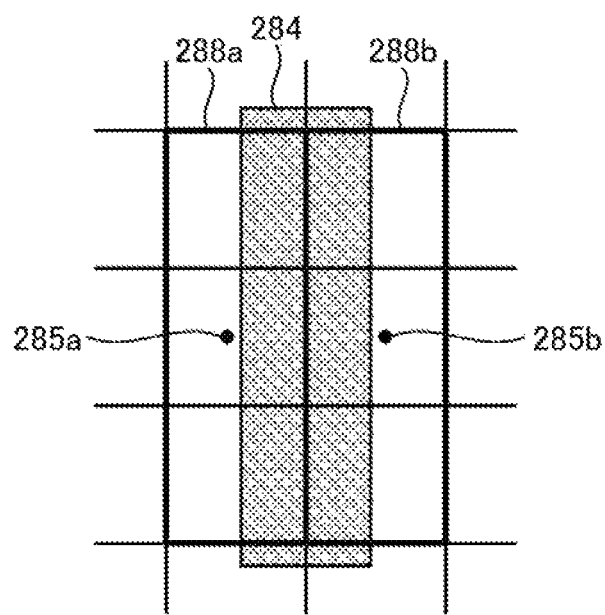
FIG. 10 is an explanatory diagram for describing an example of processing of an anchor setting unit.
Figure 11:
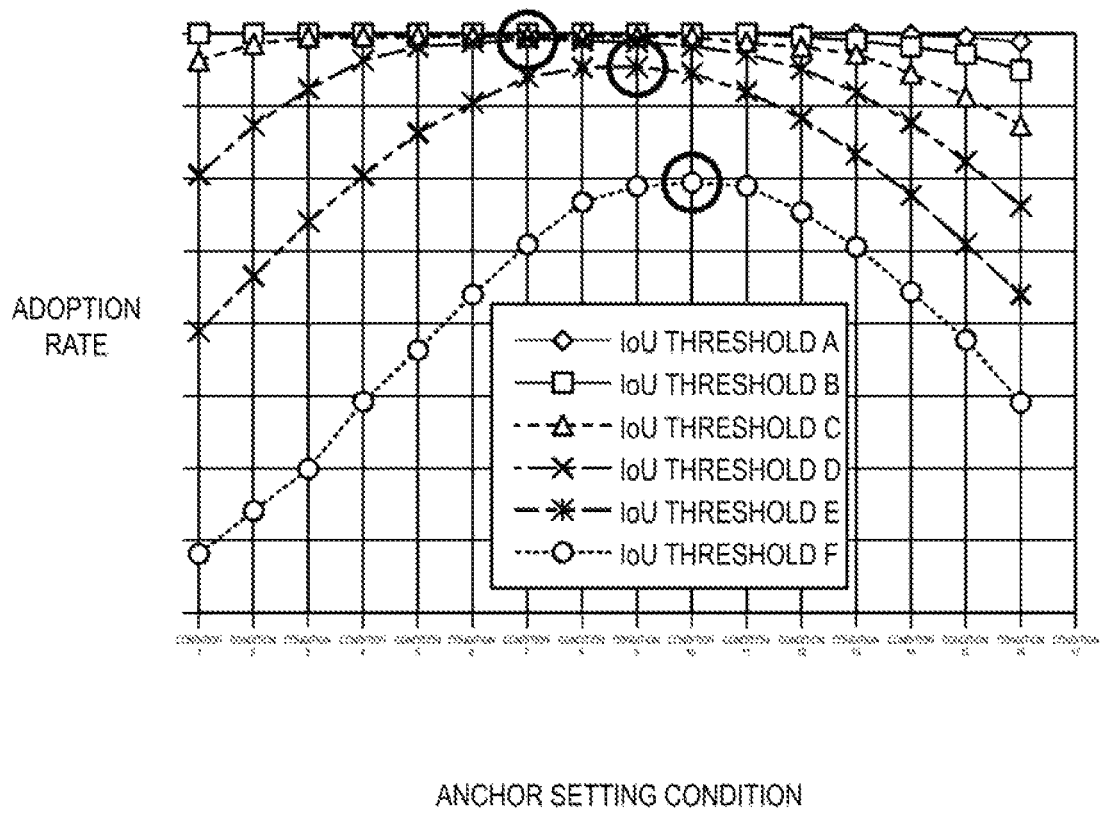
FIG. 11 is a graph showing an example of the relationship between an anchor size and an adoption rate.
Figure 12:
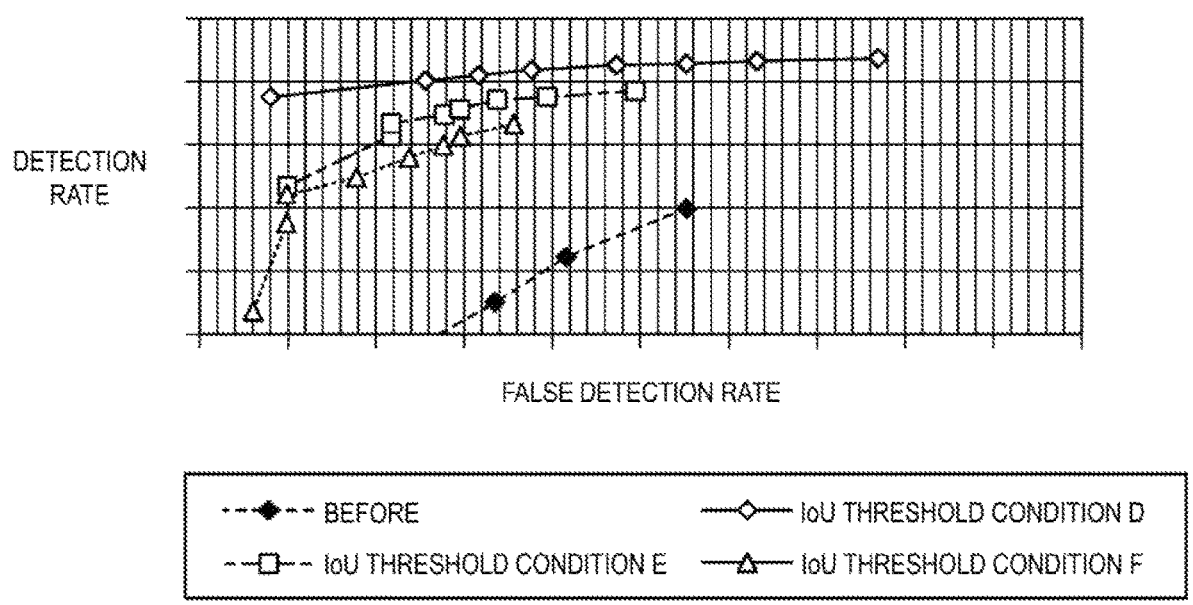
FIG. 12 is a graph showing an example of the relationship between a detection rate and a false detection rate for each anchor size.

Next, an anchor setting method will be described with reference to FIGS. 6 to 12. FIGS. 6 and 7 are explanatory diagrams for describing an anchor respectively. FIG. 8 is a flowchart illustrating an example of processing of an anchor setting unit. FIGS. 9 and 10 are explanatory diagrams for describing an example of processing of the anchor setting unit. FIG. 11 is a graph showing an example of the relationship between an anchor size and an adoption rate. FIG. 12 is a graph showing an example of the relationship between a detection rate and a false detection rate for each anchor size.

In the example illustrated in FIGS. 6 and 7, four shapes of anchor 212a, 212b, 212c, and 212d are set as the anchor 212. The anchors 212a, 212b, 212c, and 212d have the same areas and different aspect ratios. Anchors 212a, 212b, 212c, and 212d indicate states set for the cell 282. The sizes of the anchors 212a, 212b, 212c, and 212d in the vertical direction decrease in this order. The anchor 212a is a vertically long rectangle. The anchor 212d is a horizontally long rectangle.

In deep learning, by making the shape of the anchor 212 a plurality of shapes, it is possible to provide an anchor close to the shape of the bounding boxes 280 and 280a, which are regions set to include an object. For example, in the case of FIG. 6, the degree of matching between the bounding box 280 and the anchor 212a is 45%, the degree of matching between the bounding box 280 and the anchor 212b is 80%, the degree of matching between the bounding box 280 and the anchor 212c is 60%, and the degree of matching between the bounding box 280 and the anchor 212d is 30%. In the case of FIG. 7, the degree of matching between the bounding box 280a and the anchor 212a is 30%, the degree of matching between the bounding box 280a and the anchor 212b is 30%, the degree of matching between the bounding box 280a and the anchor 212c is 30%, and the degree of matching between the bounding box 280a and the anchor 212d is 5%. Here, the degree of matching is evaluated by IoU.

The anchor setting unit 32 according to the present embodiment sets the anchor based on the bounding box of the training data, thereby increasing the detection accuracy of the object. Anchor setting processing will be described with reference to FIG. 8. The processing illustrated in FIG. 8 can be realized by the anchor setting unit 32 executing the processing.

The anchor setting unit 32 acquires training data including region information of an object, that is, information of a bounding box (step S12). The anchor setting unit 32 reads the setting of the anchor (step S14). Here, the setting of the anchor is information on the aspect ratio of the anchor and the reference size with respect to the cell for all anchors used in learning.

FIGS. 9 and 10 illustrate a case where the bounding box 284 is arranged across the cell 285a and the cell 285b. FIGS. 9 and 10 illustrate a case where the size of the anchor associated with the same cell 285a and cell 285b is different. FIG. 9 illustrates an anchor 286a used in the cell 285a and an anchor 286b used in the cell 285b adjacent to the cell 285a. FIG. 10 illustrates an anchor 288a used in the cell 285a and an anchor 288b used in the cell 285b adjacent to the cell 285a. The anchor 288a and 288b of FIG. 10 is larger in size than the anchor 286a and 286b of FIG. 9. The aspect ratio of the anchor 288a and 288b in FIG. 10 is the same as the aspect ratio of the anchor 286a and 286b in FIG. 9. In FIGS. 9 and 10, the bounding box 284 of the object is set across the cells 285a and 285b.

As illustrated in FIG. 9, in a size in which there is a gap between an anchor 286a and an adjacent anchor 286b, the degree of matching of area between the anchors 286a and 286b and the bounding box of the object tends to be less likely to increase. On the other hand, as illustrated in FIG. 10, in a size in which there is no gap between the anchor 288a and the adjacent anchor 288b, the degree of matching of area between the anchors 288a and 288b and the bounding box of the object is less likely to be extremely low depending on the position, and the detection rate tends to be high. Therefore, it is preferable to evaluate the size of the anchor in a case where the size of the anchor is set to be larger or smaller than the size of the anchor with no clearance between the anchor 288a and the adjacent anchor 288b, which is illustrated in FIG. 10, as a center size.

The anchor setting unit 32 calculates the IoU at each position based on the region information of the object and the information of the anchor (step S16).

The anchor setting unit 32 determines whether the evaluation of the sizes of all the anchors is completed (step S18). When the anchor setting unit 32 determines that the evaluation of the sizes of all the anchors is not completed (No in step S18), the anchor setting unit 32 changes the sizes of the anchors (step S20) and returns to the process of step S16. That is, the anchor is changed to an unevaluated size, and IoU is calculated for the changed size.

When the anchor setting unit 32 determines that the evaluations of the sizes of all the anchors have been completed (Yes in step S18), the anchor setting unit 32 determines the dimensions (sizes) of the anchors based on the results of the evaluations (step S22).

The anchor setting unit 32 can detect the size of the anchor with which the region information of the object included in the training data can be extracted by comparing the size of the anchor with the region information of the object and evaluating the adoption rate, in a case where the sizes of the anchors are different from each other.

As shown in FIG. 11, when the threshold of IoU (IoU threshold) is set to various values, the adoption rate of the target region of the training data is calculated. The adoption rate is (the number of objects for which IoU is equal to or greater than the threshold)/(the number of objects included in all image data of the training data). The anchor setting unit 32 compares the region information of the object with each of a plurality of anchors created with the set size, and when the IoU becomes equal to or greater than the threshold for any one anchor, the number of objects, which becomes equal to or greater than the threshold value, is counted up. For example, for this value, the anchor setting unit 32 calculates the size of the anchor having the highest adoption rate in each case where the IoU threshold is different.

FIG. 12 shows the results of evaluating the image data for evaluation and calculating the detection rate and the false detection rate by setting the anchors of the size that had the highest adoption rate when the IoU thresholds are IoU threshold condition D, IoU threshold condition E and IoU threshold condition F. Here, the evaluation of the detection rate and the false detection rate can be extracted from a result obtained by creating a learned program by a method of creating a learned program described with reference to FIG. 13 and performing an extraction processing of an object of a unit of image data for evaluation using the created learned program. As illustrated in FIG. 12, when compared at the same false detection rate, the detection rate can be higher than the reference in any case. Here, the IoU threshold is used as a parameter at the time of learning of deep learning. The IoU threshold is determined, based on the result of the graph shown in FIG. 12, to be an IoU threshold that obtains a desired detection rate and false detection rate. The determined IoU threshold is used as a parameter at the time of learning. The anchor setting unit 32 may determine the size of the anchor based only on the information in FIG. 11 without calculating the detection rate and the false detection rate in FIG. 12.

Learned Program Creation Method

Figure 13:
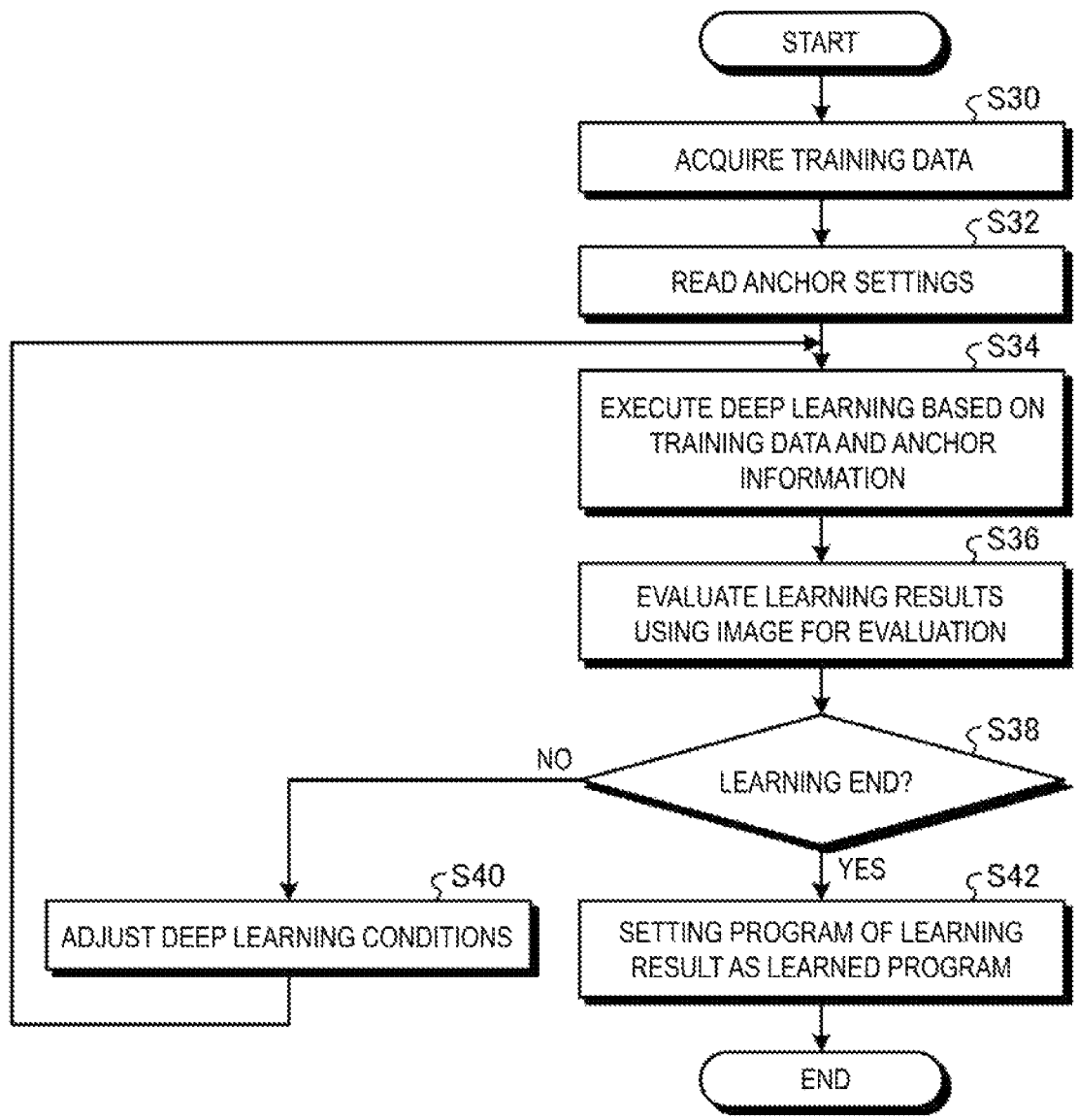
FIG. 13 is a flowchart illustrating an example of an operation of a learning unit.

FIG. 13 is a flowchart illustrating an example of an operation of the learning unit. The processing illustrated in FIG. 13 is executed by the learning unit 34 performing computation processing on the learning execution program. The learning unit 34 creates a learned program using information on the size of the anchor determined by the anchor setting unit 32. In addition, when the anchor setting unit 32 performs the processing of determining the size of the anchor, that is, when the anchor setting unit 32 determines the anchor in the above-described step S22, the learning unit 34 may create a learned program by using information on the sizes of candidate anchors.

The learning unit 34 acquires training data including region information of an object (step S30). The learning unit 34 reads the setting of the anchor (step S32). That is, the learning unit 34 reads the size information and aspect ratio information of the anchors set by the anchor setting unit 32. The learning unit 34 performs deep learning based on the training data and the anchor information (step S34). The learning unit 34 sets a deep learning model for the image of the training data based on the information of the anchor, and performs learning of the image of the training data using the set model. Accordingly, the learning unit 34 generates a learned program in which learning using the training data is executed.

The learning unit 34 evaluates the learning result using an image for evaluation (step S36). Here, the image for evaluation is a data set including both an image including the object and an image not including the object. The image for evaluation is associated with information indicating whether the object is included or not. The learning unit 34 detects the object in the evaluation image using the learned program at the evaluation time point, thereby evaluating whether the object in the evaluation image including the object has been detected, whether the evaluation image not including the object has been falsely detected as including the object, or the like. The learning unit 34 calculates a detection rate, a false detection rate, or the like, as the evaluation.

After calculating the evaluation, the learning unit 34 determines whether to end the learning (step S38). The evaluation criterion for the end of learning can be arbitrarily set. For example, the number of times of learning or the amount of computation may be used as a criterion, and the process may be ended when the detection rate or the false detection rate satisfies the set performance.

When it is determined that the learning is not ended (No in step S38), the learning unit 34 adjusts the condition of the deep learning (step S40) and returns to step S34. Thus, the learning processing is executed again. Here, the conditions of deep learning are not particularly limited, but as a learning program at the start of learning in step S34, there are setting of a current learning program, or partial replacement of an image of training data, or the like. When the learning unit 34 determines that the learning is ended (Yes in step S38), the learning unit 34 sets the program of the learning result as the learned program (step S42) and ends the processing.

As described above, the learning unit 34 executes the deep learning processing using the anchor set by the anchor setting unit 32 and creates a learned program.

Object Detection Method

Figure 14:
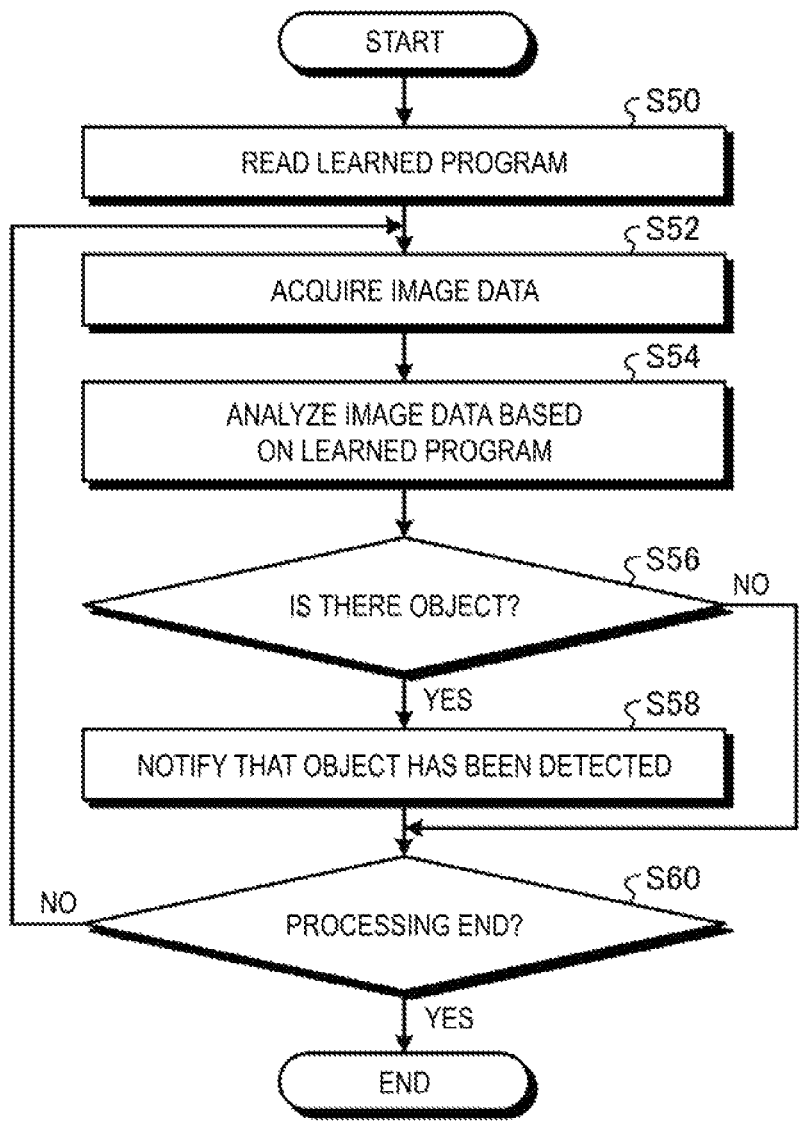
FIG. 14 is a flowchart illustrating an example of the operation of an object detection device.

Next, an object detection method using a learned program will be described with reference to FIG. 14. FIG. 14 is a flowchart illustrating an example of an operation of the object detection device. FIG. 14 will be described as processing executed by the object detection device 102, but image data may be supplied to the program creation device 10 and similar processing may be executed by the object detection processing unit 36.

The object detection device 102 reads the learned program (step S50). The object detection device 102 acquires the learned program created by the program creation device 10. The object detection device 102 acquires an image data (step S52). Specifically, the object detection device 102 acquires an image by the camera unit 112.

The object detection device 102 analyzes the image data based on the learned program (step S54). In the object detection device 102, the computation unit 114 detects whether an object is included in the image data by using the learned program created by performing deep learning under the condition of the anchors that are set by the anchor setting unit 32.

The object detection device 102 determines whether there is an object from the analysis result of the step S54 (step S56). When it is determined that there is an object (Yes in step S56), the object detection device 102 notifies the detection of the object from the notification unit 118 (step S58). When it is determined that there is no object (No in step S56), or after the processing of step S58 is executed, the object detection device 102 determines whether the process is ended (step S60). When it is determined that the processing is not ended (No in step S60), the object detection device 102 returns to step S52, acquires the next image data, and performs object detection processing. When the object detection device 102 determines that processing is ended (Yes in step S60), the object detection device ends the present processing.

In the present embodiment, as described above, in various cases in which the size (scale) of the anchor is changed using the region information of the object of the training data, comparison between the regions is performed to calculate the degree of matching, the size of the anchor in which the number of matching anchors increases at a rate equal to or greater than the threshold is calculated, and the deep learning is performed using the calculated size of the anchor. Thus, the detection accuracy of the object can be further improved. In addition, by determining the size of the anchor in the processing of performing the comparison between the regions, it is possible to determine the size of the anchor with which the detection accuracy of the object can be further improved with significantly less calculation than in the case of performing deep learning for various combinations of anchors and finding an optimum condition. Further, by using the information of the training data in which the region information is set, it is possible to execute the processing without creating new data.

Another Example of Anchor Setting Method

Figure 15:
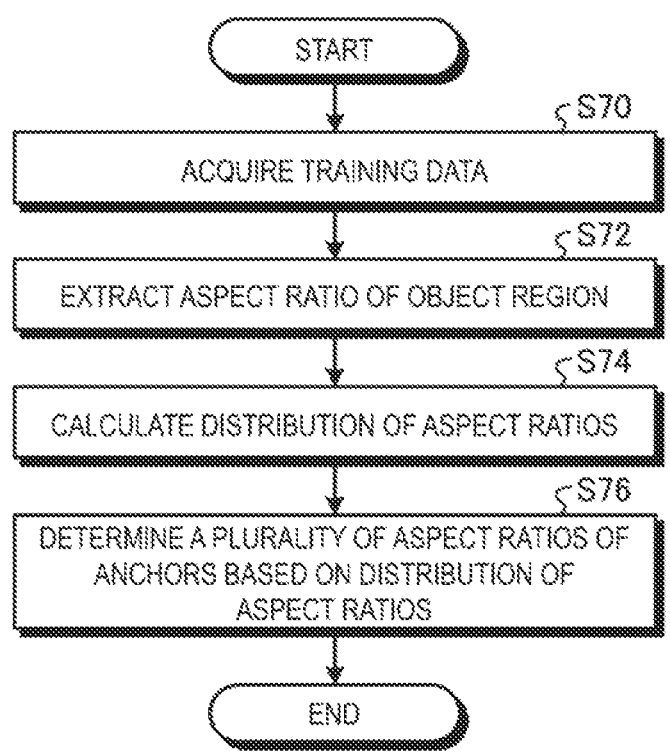
FIG. 15 is a flowchart illustrating another example of the processing of the anchor setting unit.
Figure 16:
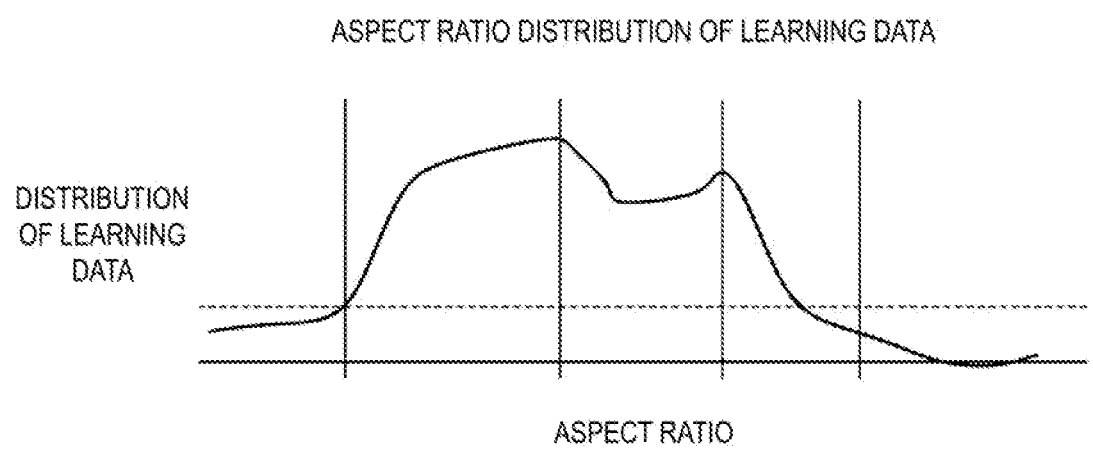
FIG. 16 is an explanatory diagram for describing another example of the processing of the anchor setting unit.

Here, the anchor setting unit 32 may determine the aspect ratio of the anchor based on information of the frame of the target region of the training data. FIG. 15 is a flowchart illustrating the another example of the processing of the anchor setting unit. FIG. 16 is an explanatory diagram for describing the another example of processing of anchor setting unit.

The anchor setting unit 32 acquires the training data (step S70). The anchor setting unit 32 extracts the distribution of the aspect ratio of the object region (step S72). The anchor setting unit 32 detects the aspect ratio of the set region for all images of the training data. When the information of the aspect ratio is set in advance, the anchor setting unit 32 may read the information of the set aspect ratio.

The anchor setting unit 32 calculates a distribution of aspect ratios (step S74). As a result, as shown in FIG. 16, the distribution of the aspect ratio of the bounding box set in the training data which is the learning data is calculated.

The anchor setting unit 32 determines a plurality of aspect ratios of the anchor based on the distribution of the aspect ratios (step S76). Specifically, based on the distribution of aspect ratios in the training data, for example, the aspect ratio positions at 2% and 98% of the percentage of the distribution and the aspect ratio position dividing evenly between those two positions are used as the aspect ratios of the anchor to be used. Alternatively, the aspect ratio of the anchor at the peak position of the distribution may be used.

In this manner, by setting the aspect ratio of the anchor based on the distribution of the aspect ratios of the training data, the aspect ratio of the anchor can be determined based on the aspect ratio of the object to be detected on the image. Accordingly, it is possible to further improve the detection accuracy of the object by the anchor.

Another Example of Anchor Setting Method

Figure 17:
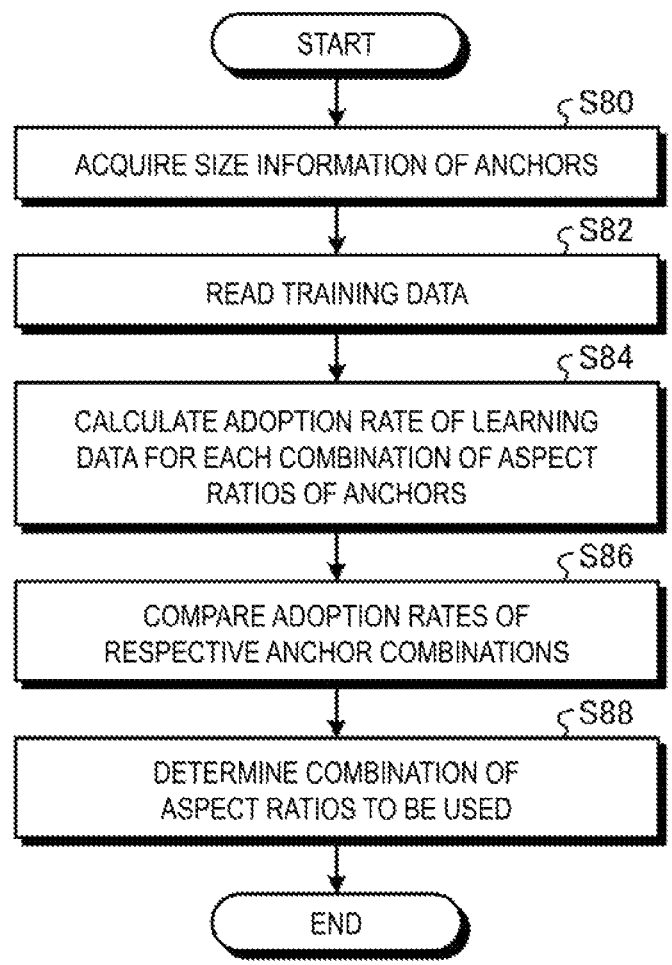
FIG. 17 is a flowchart illustrating another example of the processing of the anchor setting unit.
Figure 18:
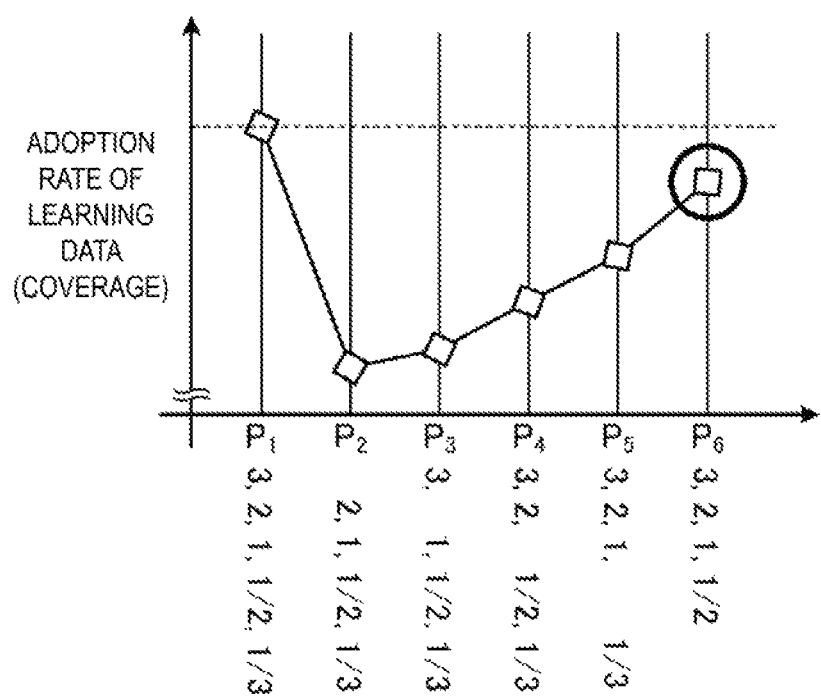
FIG. 18 is an explanatory diagram for describing another example of the processing of the anchor setting unit.

After determining the size of the anchor, the anchor setting unit 32 may evaluate the anchor to be used and reduce the number of anchors. That is, a combination of aspect ratios of anchors to be used may be evaluated, and anchors having aspect ratios that have a small influence on the detection rate may not be used. FIG. 17 is a flowchart illustrating another example of the processing of the anchor setting unit. FIG. 18 is an explanatory diagram for describing the another example of processing of an anchor setting unit.

The anchor setting unit 32 executes the present processing after determining the size of the anchor illustrated in FIG. 8. The anchor setting unit 32 acquires size information of the anchor (step S80). The anchor setting unit 32 reads the training data (learning data) (step S82). The anchor setting unit 32 calculates the adoption rate of the learning data for each combination of the aspect ratios of the anchors (step S84).

For example, in the example illustrated in FIG. 18, in the initial setting, as shown in the pattern $P_1$, five anchors having different aspect ratios of 3, 2, 1, 1/2, and 1/3 are used. On the other hand, the adoption rate when four anchors are used is calculated. The pattern $P_2$ is a combination of anchors having aspect ratios of 2, 1, 1/2, and 1/3 other than 3. The pattern $P_3$ is a combination of anchors having aspect ratios of 3, 1, 1/2, and 1/3 other than 2. The pattern $P_4$ is a combination of anchors having aspect ratios of 3, 2, 1/2, and 1/3 other than 1. The pattern $P_5$ is a combination of anchors having aspect ratios of 3, 2, 1, and 1/3 other than 1/2. The pattern $P_6$ is a combination of anchors having aspect ratios of 3, 2, 1, and 1/2 other than 1/3. The anchor setting unit 32 calculates the adoption rate for all patterns.

The anchor setting unit 32 compares the adoption rates of the respective anchor combinations (step S86). As illustrated in FIG. 18, the anchor setting unit 32 compares the adoption rates of the learning data in the respective patterns. The anchor setting unit 32 determines a combination of aspect ratios to be used (step S88). The anchor setting unit 32 sets a combination, in which the reduction in the adoption rate of the learning data is within the threshold and the number of anchors to be used is smaller, as a combination of aspect ratios to be used. When the number of anchors is the same, a combination having the highest adoption rate of learning data is set as a combination of anchors having aspect ratios to be used. In the example shown in FIG. 18, a combination of $P_6$ anchors is employed.

In this manner, the anchor setting unit 32 evaluates the combination of anchors and considers the combination of reducing the number of anchors to be used while suppressing a reduction in the adoption rate, and thus it is possible to reduce the amount of calculation while suppressing a reduction in the accuracy of detection of an object. In addition, by performing evaluation using training data, it is possible to obtain a combination of anchors suitable for detection of an object.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A program creation device configured to create an object detection program for detecting whether an object is included in an image, the program creation device comprising:
   training data including a plurality of image data including area information of the object;
   a setting unit configured to set an anchor that is information of a frame specifying a region for each cell for detecting a presence or absence of the object from the image; and
   a learning unit configured to execute machine learning of the training data based on the information of the setting unit and to create a learned program for extracting the object from the image,
   wherein the setting unit is configured to:
   acquire information on a target region of the training data and on aspect ratios of the anchor, calculate a degree of matching between the anchor and the target region for each aspect ratio while changing a size of the anchor, and calculate an adoption rate of the target region whose degree of matching is a proportion no less than a threshold, and
   determine, based on a result of the calculation of the adoption rate, the size of the anchor used in the learned program.

2. The program creation device according to claim 1, wherein the setting unit is further configured to set a plurality of values of a degree of matching as thresholds, calculate the adoption rate for each of the thresholds, and determine sizes of a plurality of anchors based on a result of the calculation of the adoption rate for each of the thresholds.

3. The program creation device according to claim 1, wherein the setting unit is further configured to set, based on the threshold, the size of the anchor having a highest adoption rate as the size of the anchor to be determined.

4. The program creation device according to claim 1, wherein the setting unit is further configured to calculate an aspect ratio of the target region of the training data, and determine the aspect ratio of the anchor based on a distribution of the aspect ratio of the target region.

5. The program creation device according to claim 1, wherein the setting unit is further configured to:
   calculate a detection rate for each of set aspect ratios for the training data based on the determined size of the anchor, and
   determine, based on a result of the calculation of the detection rate, a combination of the aspect ratios of the anchor to be used in the learned program.

6. The program creation device according to claim 5, wherein the setting unit is further configured to set, as anchors to be used in the learned program, some of the anchors having the aspect ratios for which detection rates have been calculated.

7. An object detection system, comprising:
   the program creation device according to claim 1; and
   an object detection device including:
      a computation unit configured to execute the learned program created by the program creation device,
      a camera unit configured to acquire an image, and
      a notification unit configured to notify an operator,
   wherein the computation unit is configured to analyze, by the learned program, the image acquired by the camera unit, and
   wherein the notification unit is configured to notify when the object is detected in the image.

8. An anchor setting method of setting an anchor used in an object detection program for detecting whether an object is included in an image, the anchor setting method comprising:
   acquiring training data including a plurality of image data including area information of the object;
   acquiring anchor information that is information of a frame specifying a region for each cell for detecting a presence or absence of the object from the image;
   executing machine learning of the training data based on the anchor information to create a learned program for extracting the object from the image;
   acquiring information on a target region of the training data and on aspect ratios of the anchor, calculating a degree of matching between the anchor and the target region for each aspect ratio while changing a size of the anchor, and calculating an adoption rate of the target region whose degree of matching is a proportion no less than a threshold; and
   determining, based on a result of the calculating of the adoption rate, the size of the anchor used in the learned program.

9. A non-transitory computer readable medium storing an anchor setting program for causing a processing of setting an anchor to be executed, the anchor being used in an object detection program for detecting whether an object is included in an image, wherein the anchor setting program causes to be executed:
   acquiring training data including a plurality of image data including area information of the object,
   acquiring anchor information that is information of a frame specifying a region for each cell for detecting a presence or absence of the object from the image,
   executing machine learning of the training data based on the anchor information to create a learned program for extracting the object from the image,
   acquiring information on a target region of the training data and on aspect ratios of the anchor, calculating a degree of matching between the anchor and the target region for each aspect ratio while changing a size of the anchor, and calculating an adoption rate of the target region whose degree of matching is a proportion no less than a threshold, and
   determining, based on a result of the calculating of the adoption rate, the size of the anchor used in the learned program.

* * * * *